(12) United States Patent  (10) Patent No.: US 10,164,556 B2
Tsai  (45) Date of Patent: Dec. 25, 2018

(54) CONTROL APPARATUS FOR ELIMINATING MAGNETIZING ERROR OF ROTOR IN DC MOTOR AND METHOD THEREOF

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 435 days.

(21) Appl. No.: 14/945,412

(22) Filed: Nov. 18, 2015

(65) Prior Publication Data

US 2017/0025972 A1    Jan. 26, 2017

(30) Foreign Application Priority Data

Jul. 24, 2015 (TW) .............................. 104124051 A

(51) Int. Cl.
*H02P 7/29* (2016.01)
*H02P 7/03* (2016.01)

(52) U.S. Cl.
CPC .................. *H02P 7/29* (2013.01); *H02P 7/04* (2016.02)

(58) Field of Classification Search
CPC .............. A61M 1/1005; A61M 1/1055; A61M 1/1081; A61M 1/1086
See application file for complete search history.

(56) References Cited

U.S. PATENT DOCUMENTS

| 5,757,161 | A | * | 5/1998 | Ikkai | B60L 3/00 180/171 |
| 6,069,464 | A | * | 5/2000 | Wu | G05B 11/28 318/610 |
| 6,081,091 | A | * | 6/2000 | Mitchell | H02P 6/182 318/254.2 |
| 7,233,121 | B2 | * | 6/2007 | Wu | H02P 6/15 318/400.17 |

(Continued)

FOREIGN PATENT DOCUMENTS

| CN | 103649685 A | 3/2014 |
| JP | 2010-158147 A | 7/2010 |

(Continued)

*Primary Examiner* — Shawki S Ismail
*Assistant Examiner* — Zoheb Imtiaz
(74) *Attorney, Agent, or Firm* — Li & Cai Intellectual Property (USA) Office

(57) ABSTRACT

A control apparatus for eliminating a magnetizing error of a rotor in a DC motor and a method thereof. The rotor in the DC motor is provided with 2N magnetic pole positions disposed therein for phase switching, where N is a positive integer no less than 1. The control apparatus includes a phase detector, at least one counter, a PWM signal generator, control circuit and a full-bridge driving circuit. The phase detector detects changes of states of the magnetic pole positions of the rotor to generate a periodic phase-switching signal. The counter counts a count value associated with each of the magnetic pole positions, respectively. The PWM signal generator periodically outputs 2N PWM signals and adjusts each of the PWM signals issued in a next cycle, respectively, according to the count value associated with each of the magnetic pole positions received in a current cycle.

8 Claims, 8 Drawing Sheets

(56) References Cited

U.S. PATENT DOCUMENTS

| | | | | |
|---|---|---|---|---|
| 8,030,867 B1* | 10/2011 | Allison, III | | H02P 6/182 318/400.01 |
| 8,089,232 B2* | 1/2012 | Itagaki | | G11B 19/2054 318/400.02 |
| 2001/0002784 A1* | 6/2001 | Masaki | | H02P 6/18 318/727 |
| 2003/0189414 A1* | 10/2003 | Muroi | | H02P 23/16 318/400.08 |
| 2004/0017172 A1* | 1/2004 | Hoashi | | H02P 6/085 318/599 |
| 2006/0119300 A1* | 6/2006 | Armstrong | | H02P 6/10 318/400.04 |
| 2007/0248337 A1* | 10/2007 | Ling | | H02P 6/34 388/811 |
| 2008/0082182 A1* | 4/2008 | Iesaki | | G03G 15/602 700/31 |
| 2008/0100245 A1* | 5/2008 | Turner | | H02P 23/14 318/437 |
| 2008/0203957 A1* | 8/2008 | Nozaki | | G05B 11/28 318/603 |
| 2008/0219648 A1* | 9/2008 | Liu | | H02P 6/16 388/811 |
| 2008/0252241 A1* | 10/2008 | Yu | | H02P 6/18 318/400.14 |
| 2008/0297079 A1* | 12/2008 | Kanamori | | H02P 6/18 318/400.06 |
| 2011/0290205 A1* | 12/2011 | Kozawa | | F01L 1/352 123/90.17 |
| 2012/0133316 A1* | 5/2012 | Inoue | | H02P 23/22 318/503 |
| 2013/0038260 A1* | 2/2013 | Chang | | H02P 6/085 318/400.35 |
| 2015/0061551 A1* | 3/2015 | Tsai | | H02P 7/29 318/400.2 |
| 2015/0123582 A1* | 5/2015 | Gu | | H02P 6/182 318/400.35 |
| 2016/0241172 A1* | 8/2016 | Leman | | H02P 6/08 |
| 2017/0025972 A1* | 1/2017 | Tsai | | H02P 7/29 |

FOREIGN PATENT DOCUMENTS

| | | |
|---|---|---|
| TW | M511819 U | 11/2002 |
| TW | 201006118 A | 2/2010 |
| TW | 201511461 A1 | 3/2015 |

\* cited by examiner

CONTROL APPARATUS FOR ELIMINATING MAGNETIZING ERROR OF ROTOR IN DC MOTOR AND METHOD THEREOF

BACKGROUND

1. Technical Field

The present invention generally relates to a control apparatus for phase switching of a direct-current (DC) motor and, more particularly, to a control apparatus and a method thereof, capable of counting a count value associated the change of the state of each of the magnetic pole positions of the rotor in the DC motor to adjust each of the PWM signals issued in a next cycle to control the ON or Off states of semiconductor switching devices to lower the vibration noise and increase the rotational speed of the motor.

2. Description of Related Art

Generally, in a conventional DC motor, semiconductor switching devices are often used to implement electronic phase-switching. For example, phase-switching operations are performed by switching the semiconductor switching devices according to detected magnetic pole positions (N poles and S poles) of a rotor in the DC motor. However, during the switching process of the semiconductor switching devices, an unstable coil current may easily occur to induce vibration noise due to motor resonance, which affects the rotational speed of the DC motor. Accordingly, it is important to provide a control circuit and a method thereof, capable of stabilizing the operation of a DC motor.

Substantially, with reference to FIG. 1A, FIG. 1A is a schematic diagram of a driving circuit of a conventional DC motor. The driving circuit 10 is an H-bridge circuit including four semiconductor switching devices Q1~Q4 and is electrically connected to the DC motor 12 through the output terminals A and B. In addition, during the switching process, the semiconductor switching devices Q1~Q4 are categorized into two different conducting phases. The semiconductor switching devices Q1 and Q4 are turned on in the first phase, while the semiconductor switching devices Q2 and Q3 are turned on in the second phase. Therefore, the driving circuit 10 has to be controlled to switch between the two conducting phases to effectively drive the DC motor 12 to rotate. Furthermore, referring to FIG. 1B, FIG. 1B is a schematic diagram of a control circuit of a conventional DC motor. An external Hall device HAL is used to sense the change of the state of each of the magnetic pole positions of the rotor in the DC motor 12 to generate a periodic phase-switching signal HC. Then, a control circuit 14 receives a PWM signals PW generated by an external PWM signal generator 16 and the phase-switching signal HC to output switch control signals H1, H2, L1 and L2 to control the ON or Off states of semiconductor switching devices Q1~Q4 in the driving circuit 10. Afterwards, the driving circuit 10 alternately outputs a first output signal VOUT1 and a second output signal VOUT2 to the DC motor 12 so that the state of each of the magnetic pole positions of the rotor in the DC motor 12 changes accordingly to effectively drive the DC motor 12 to rotate.

However, since the rotor in the DC motor 12 is usually made of permanent magnets, the size of each of the magnetic pole positions of the rotor may vary.

SUMMARY

One embodiment of the present invention provides a control apparatus for eliminating a magnetizing error of a rotor in a DC motor. The rotor in the DC motor is provided with 2N magnetic pole positions disposed therein for phase switching. N is a positive integer no less than 1. The control apparatus includes a phase detector, at least one counter, a PWM signal generator, a control circuit and a full-bridge driving circuit. The phase detector detects changes of states of the magnetic pole positions of the rotor in the DC motor to generate a periodical phase-switching signal. The counter is coupled to the phase detector and counts a count value related to each of the magnetic pole positions, respectively, according to the periodical phase-switching signal. The PWM signal generator is coupled to the counter and the phase detector and periodically outputs 2N PWM signals. The PWM signal generator adjusts each of the PWM signals outputted in order in a next cycle according to the count value, related to each of the magnetic pole positions, received in a current cycle. The control circuit is coupled to the PWM signal generator and the phase detector and outputs respectively a first direction driving signal, a second direction driving signal, a third logic signal and a fourth logic signal according to the PWM signals and the periodical phase-switching signal. The full-bridge driving circuit includes two output terminals coupled to the DC motor, and alternately outputs a first output signal and a second output signal to the DC motor according to the first direction driving signal, the second direction driving signal, the third logic signal and the fourth logic signal so that the magnetic pole positions of the rotor in the DC motor change to drive the DC motor to rotate.

One embodiment of the present invention further provides a control method for a control apparatus for eliminating a magnetizing error of a rotor in a DC motor. The rotor in the DC motor is provided with 2N magnetic pole positions disposed therein for phase switching. N is a positive integer no less than 1. The control apparatus includes a phase detector, at least one counter, a PWM signal generator, a control circuit and a full-bridge driving circuit. The PWM signal generator periodically outputs 2N PWM signals so that the magnetic pole positions of the rotor in the DC motor change. The control method includes the steps herein. The phase detector detects changes of states of the magnetic pole positions of the rotor in the DC motor to generate a periodical phase-switching signal. The counter counts a count value related to each of the magnetic pole positions, respectively, according to the periodical phase-switching signal. The PWM signal generator adjusts each of the PWM signals outputted in order in a next cycle according to the count value, related to each of the magnetic pole positions, received in a current cycle. The control circuit outputs respectively a first direction driving signal, a second direction driving signal, a third logic signal and a fourth logic signal according to the PWM signals and the periodical phase-switching signal. The full-bridge driving circuit alternately outputs a first output signal and a second output signal to the DC motor according to the first direction driving signal, the second direction driving signal, the third logic signal and the fourth logic signal so that the magnetic pole positions of the rotor in the DC motor change to drive the DC motor to rotate.

As stated above, one embodiment of the present invention provides a control apparatus for eliminating a magnetizing error of a rotor in a DC motor and a method thereof, capable of counting a count value associated with the change of the state of each of the magnetic pole positions of the rotor in the DC motor to adjust each of the PWM signals issued in a next cycle to control the ON or Off states of semiconductor switching devices to lower the vibration noise and increase the rotational speed of the motor.

Therefore, the first output signal VOUT1 and the second output signal VOUT2 from the driving circuit 10 are different when the driving circuit 10 is controlled to switch between the two conducting phases.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

Figure 1A:
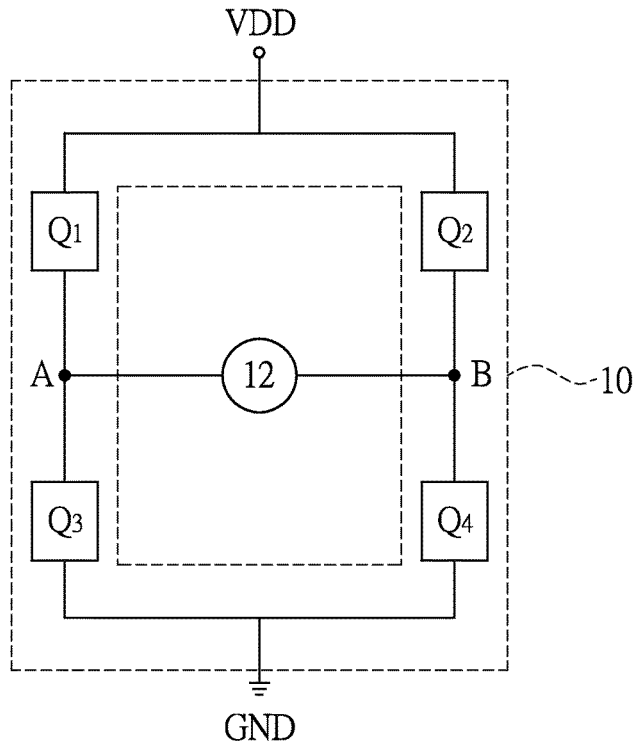
FIG. 1A is a schematic diagram of a driving circuit of a conventional DC motor.
Figure 1B:
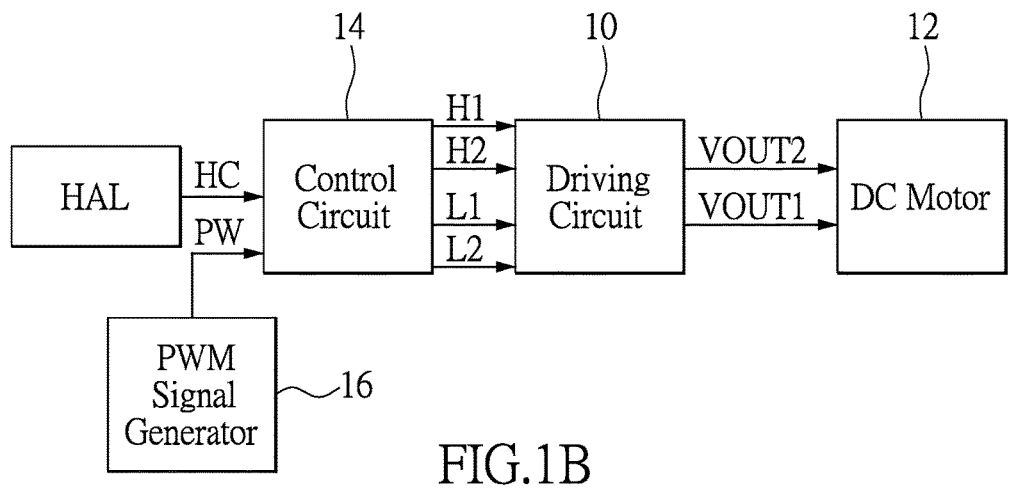
FIG. 1B is a schematic diagram of a control circuit of a conventional DC motor.
Figure 2:
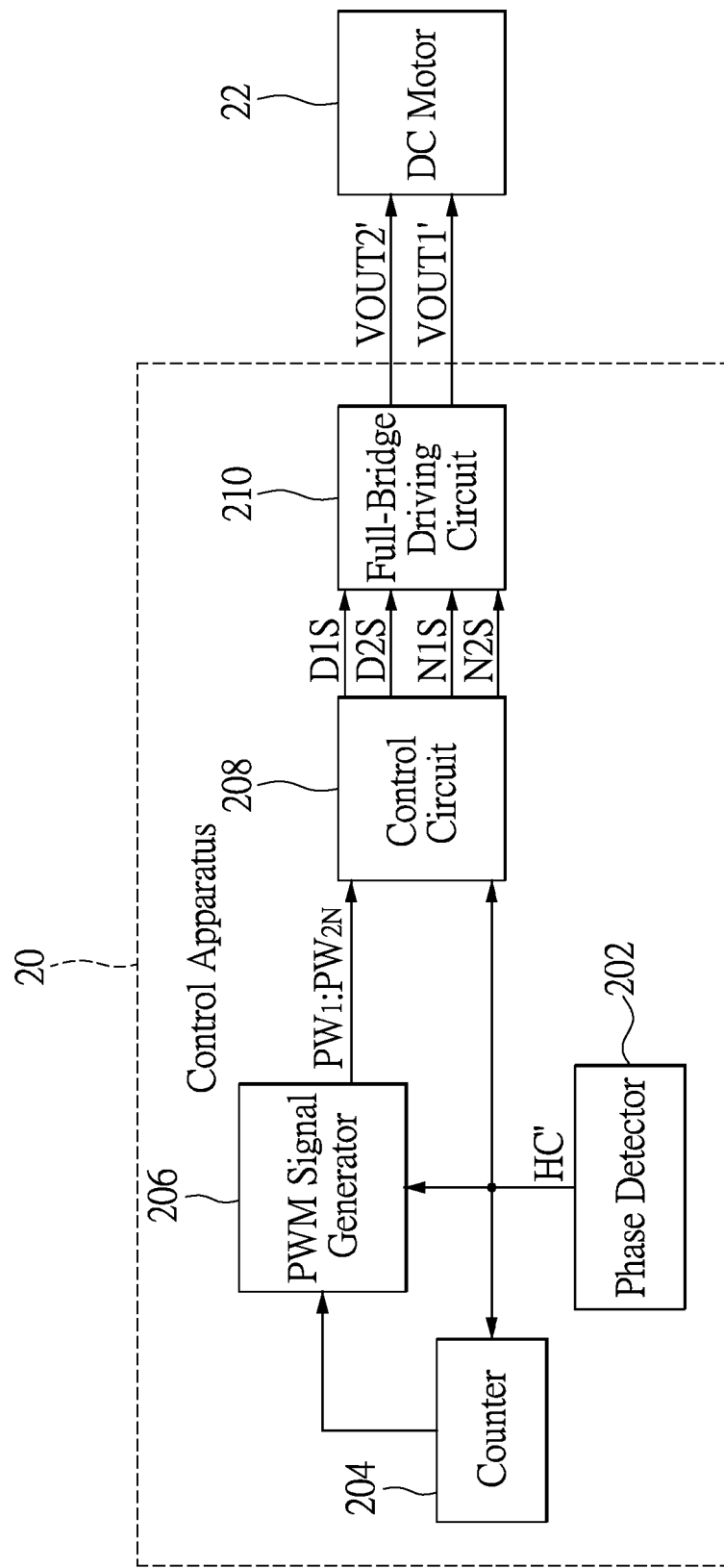
FIG. 2 is a schematic block diagram of a control apparatus for eliminating a magnetizing error of a rotor in a DC motor according to one embodiment of the present invention.

With reference to FIG. 2, FIG. 2 is a schematic block diagram of a control apparatus for eliminating a magnetizing error of a rotor in a DC motor according to one embodiment of the present invention. The control apparatus 20 includes a phase detector 202, at least one counter 204, a PWM signal generator 206, a control circuit 208 and a full-bridge driving circuit 210. These elements in the control apparatus 20 can be implemented by hardware circuitry, or by hardware circuitry with firmware or with software. Accordingly, the present invention is not limited to the previous example of the control apparatus 20. Moreover, the phase detector 202, the counter 204, the PWM signal generator 206, the control circuit 208 and the full-bridge driving circuit 210 can be integrated or discretely installed, to which the present invention is not limited.

In short, in one embodiment of the present invention, the rotor in the DC motor 22 is provided with 2N magnetic pole positions for phase switching. Then, the phase detector 202 detects the changes of the states of the 2N magnetic pole positions of the rotor in the DC motor 22 to generate a periodical phase-switching signal HC'. The counter 204 is coupled to the phase detector 202. The counter 204 counts a count value related to each of the magnetic pole positions, respectively, according to the periodical phase-switching signal HC'. The PWM signal generator 206 is coupled to the counter 204 and the phase detector 202. The PWM signal generator 206 periodically outputs 2N PWM signals PW1~PW2N. The PWM signal generator 206 adjusts each of the PWM signals PW1~PW2N outputted in order in a next cycle according to the count value, related to each of the magnetic pole positions, received in a current cycle. The control circuit 208 is coupled to the PWM signal generator 206 and the phase detector 202. The control circuit 208 outputs respectively a first direction driving signal D1S, a second direction driving signal D2S, a third logic signal N1S and a fourth logic signal N2S according to the PWM signals PW1~PW2N and the periodical phase-switching signal HC'. The full-bridge driving circuit 210 includes two output terminals coupled to the DC motor, and alternately outputs a first output signal VOUT1' and a second output signal VOUT2' to the DC motor 22 according to the first direction driving signal D1S, the second direction driving signal D2S, the third logic signal N1S and the fourth logic signal N2S so that the magnetic pole positions of the rotor in the DC motor 22 change to drive the DC motor 22 to rotate.

Furthermore, since the configuration of the DC motor 22 is known to persons with ordinary skill in the art, detailed description thereof is not repeated herein. It should be noted that, the present invention is not limited to the number of magnetic pole positions of the rotor in the DC motor 22. A person of ordinary skill in the art may decide the number of magnetic pole positions according to practical demands. In other words, in one embodiment of the present invention, N can be any positive integer no less than 1. Therefore, to make it more easily understood, in the present invention, N equals 2 for example, to which the present invention is not limited. In this case, 4 magnetic pole positions N1, S1, N2 and S2 of the rotor in the DC motor 22 are provided for phase switching.

Moreover, the phase detector 202 may be a Hall-effect element, to which the present invention is not limited. The Hall-effect element detects the changes of the states of the magnetic pole positions N1, S1, N2 and S2 of the rotor in the DC motor 22 to generate a periodical phase-switching signal HC'. In other words, with the use of the phase-switching signal HC', the control apparatus 20 can identify which one of the magnetic pole positions N1, S1, N2 and S2 the rotor in the DC motor 22 is switched to. Then, the counter 204 counts a count value related to each of the magnetic pole positions N1, S1, N2 and S2, respectively, based on the periodical phase-switching signal HC'. For example, in the present embodiment, the counter 204 repeats counting as the phase-switching signal HC' switches. Therefore, a count value acquired by the counter 204 indicates a count value counted during a time interval with respect to each of the magnetic pole positions N1, S1, N2 and S2 in the phase-switching signal HC'.

According to the above, the person with ordinary skill in the art should understand that, in a best mode, each of the magnetic pole positions N1, S1, N2 and S2 occupies a quarter of the rotor in the DC motor 22. Therefore, when the rotational speed is fixed, the time interval with respect to each of the magnetic pole positions N1, S1, N2 and S2 in the phase-switching signal HC' is identical. In other words, the count value acquired by the counter 204 with respect to each of the magnetic pole positions N1, S1, N2 and S2 is also identical. However, practically, the size of each of the magnetic pole positions N1, S1, N2 and S2 is not exactly equal to a quarter of the rotor in the DC motor 22 due to manufacturing error. In some cases, the sizes of the magnetic pole positions N1 and N2 can be much larger than the sizes of the magnetic pole positions S1 and S2.

Figure 3:
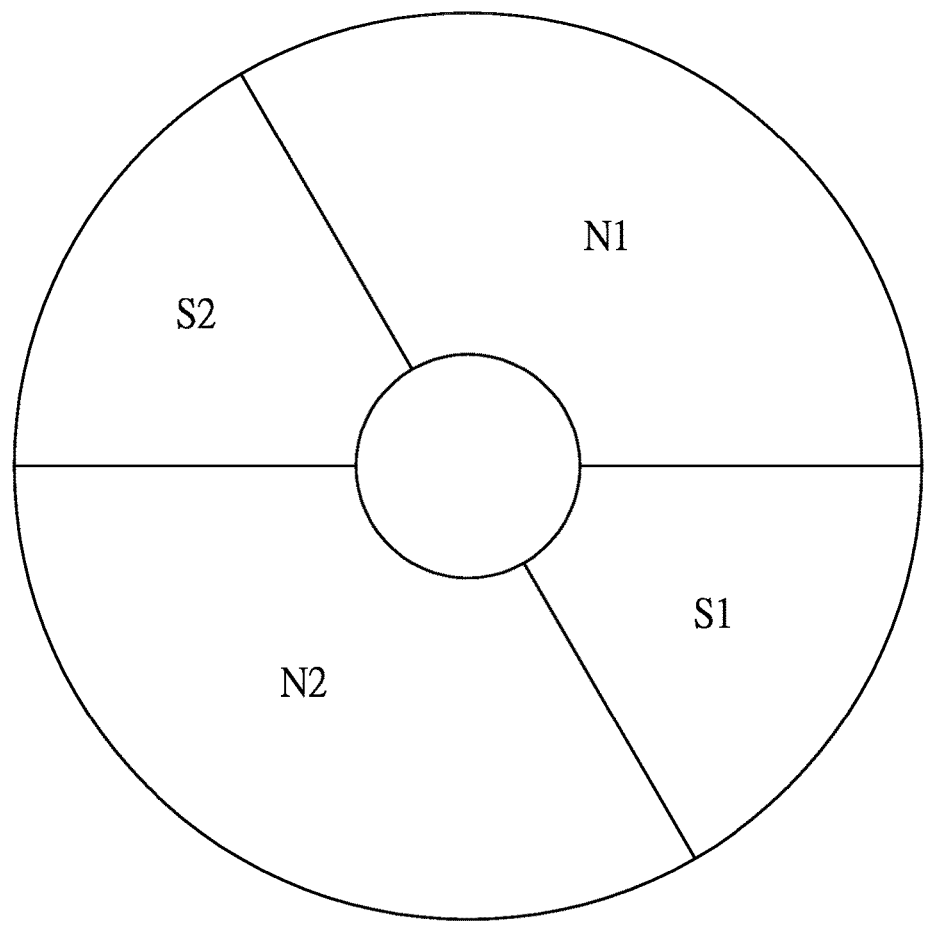
FIG. 3 is a schematic diagram of a rotor in a DC motor according to one embodiment of the present invention.
Figure 4:
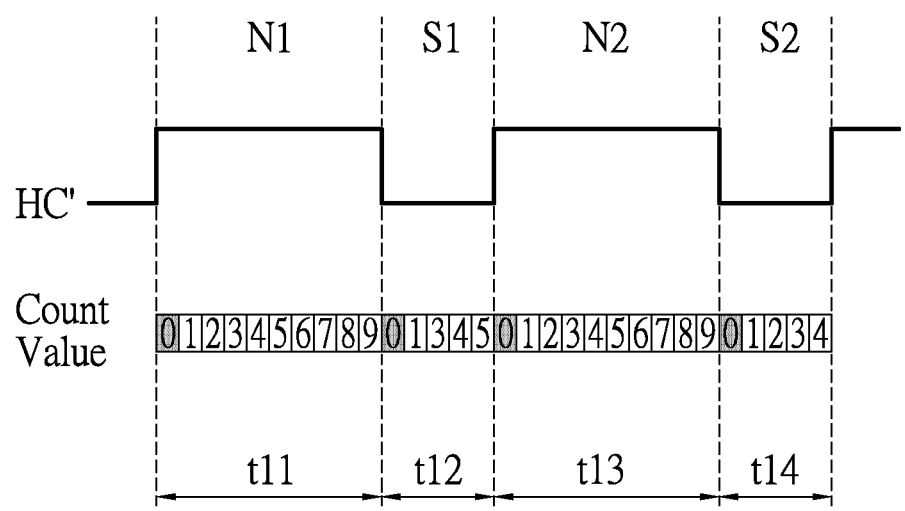
FIG. 4 is a waveform diagram showing the operation of a phase detector and a counter of the control apparatus in FIG. 2.

For example, with reference to FIG. 3 and FIG. 4, FIG. 3 is a schematic diagram of a rotor in a DC motor according to one embodiment of the present invention and FIG. 4 is a waveform diagram showing the operation of a phase detector and a counter of the control apparatus in FIG. 2. Therefore, when each of the magnetic pole positions N1 and N2 occupies a third of the rotor in the DC motor 22 and each of the magnetic pole positions S1 and S2 occupies a sixth of the rotor in the DC motor 22, in the phase-switching signal HC' generated by the phase detector 202, the time intervals t11 and t13 with respect to the magnetic pole positions N1 and N2 are much longer than the time intervals t12 and t14 with respect to the magnetic pole positions S1 and S2. Similarly, the count values associated with the magnetic pole positions N1 and N2 are much larger than the count values associated with the magnetic pole positions S1 and S2.

Figure 5:
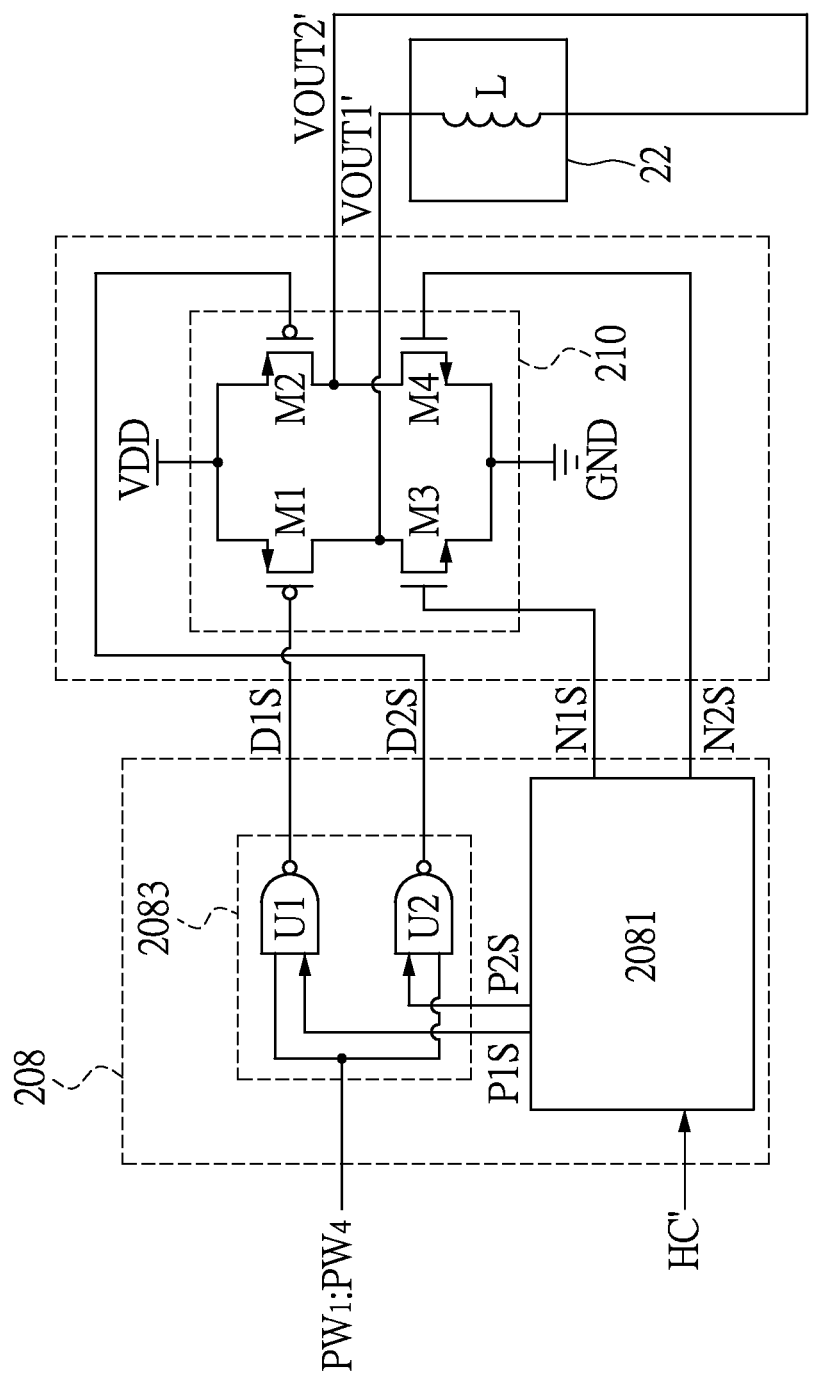
FIG. 5 is a schematic diagram of a control circuit and a full-bridge driving circuit of the control apparatus in FIG. 2.

According to the above, a person of ordinary skill in the art would understand that the PWM signals PW1~PW4 outputted in order by the PWM signal generator 206 result from effectively controlling the full-bridge driving circuit 210 to be switched in two conducting phases by the control circuit 208. It should be noted that, to further describe the implementation of the control circuit 208 and the full-bridge driving circuit 210 in the control apparatus 20, the present invention further provides another embodiment. With reference to FIG. 5, FIG. 5 is a schematic diagram of a control circuit and a full-bridge driving circuit of the control apparatus in FIG. 2. However, the control circuit 208 and the full-bridge driving circuit 210 of the control apparatus 20 are only exemplary and the present invention is not limited thereto. Moreover, the control circuit 208 and full-bridge driving circuit 210 can be used with the control apparatus 20 in FIG. 2. Therefore, please also refer to FIG. 2 and FIG. 3. Elements in FIG. 5 are labeled in the same manner as in FIG. 2, and descriptions thereof are not repeated herein.

First, the control circuit 208 further includes a logic circuit 2081 and a switching circuit 2083. The logic circuit 2081 is coupled to the phase detector 202. The switching circuit 2083 is coupled to the logic circuit 2081 and the PWM signal generator 206. More particularly, the logic circuit 2081 receives a phase-switching signal HC' and outputs a first logic signal P1S, a second logic signal P2S, a third logic signal N1S and a fourth logic signal N2S with a high voltage level or a low voltage level according to a level state of the phase-switching signal HC'. Furthermore, in the present embodiment, the first logic signal P1S and the fourth logic signal N2S have the same waveform (i.e., the same voltage level) and the second logic signal P2S and the third logic signal N1S have the same waveform (i.e., the same voltage level). The first logic signal P1S is reverse to the second logic signal P2S.

Moreover, the switching circuit 2083 generates a first direction driving signal D1S according to the PWM signals PW1~PW4 and the first logic signal P1S and generates a second direction driving signal D2S according to the PWM signals PW1~PW4 and the second logic signal P2S. In the present embodiment, when the voltage level of the first logic signal P1S is high, the first direction driving signal D1S is reverse to the PWM signals PW1~PW4. When the voltage level of the first logic signal P1S is low, the voltage level of the first direction driving signal D1S is high. On the other hand, when the voltage level of the second logic signal P2S is high, the second direction driving signal D2S is reverse to the PWM signals PW1~PW4. When the voltage level of the second logic signal P2S is low, the voltage level of the second direction driving signal D2S is high.

Furthermore, the switching circuit 2083 includes a first NAND gate U1 and a second NAND gate U2. The full-bridge driving circuit 210 includes four semiconductor switching devices in an H-bridge configuration. These semiconductor switching devices are coupled between the control circuit 208 and a coil L of the DC motor 22 and include a first up-bridge switching device M1, a second up-bridge switching device M2, a first down-bridge switching device M3 and a second down-bridge switching device M4.

More particularly, an input terminal of the first NAND gate U1 is connected respectively to an output terminal of the PWM signal generator 206 and the logic circuit 2081. An output terminal of the first NAND gate U1 is electrically connected to the gate of the first up-bridge switching device M1 of the full-bridge driving circuit. An input terminal of the second NAND gate U2 is connected respectively to the output terminal of the PWM signal generator 206 and the logic circuit 2081. An output terminal of the second NAND gate U2 is electrically connected to the gate of the second up-bridge switching device M2 of the full-bridge driving circuit 208. The source of the first up-bridge switching device M1 and the source of the second up-bridge switching device M2 are electrically connected to the system voltage VDD, respectively. The drain and the gate of the first down-bridge switching device M3 are electrically connected to the drain of the first up-bridge switching device M1 and the logic circuit 2081, respectively. The source of the first down-bridge switching device M3 is electrically connected to the ground voltage GND. The drain and the gate of the second down-bridge switching device M4 are electrically connected to the drain of the second up-bridge switching device M2 and the logic circuit 2081, respectively. The source of the second down-bridge switching device M4 is electrically connected to the ground voltage GND.

The first NAND gate U1 receives the PWM signals PW1~PW4 and the first logic signal P1S, respectively, and outputs the first direction driving signal D1S to the gate of the first up-bridge switching device M1 to control the ON or OFF state of the first up-bridge switching device M1.

The second NAND gate U2 receives the PWM signals PW1~PW4 and the second logic signal P2S, respectively, and outputs the second direction driving signal D2S to the gate of the second up-bridge switching device M2 to control the ON or OFF state of the second up-bridge switching device M2.

The first up-bridge switching device M1 receives the first direction driving signal D1S and determines the ON or OFF state thereof according to the first direction driving signal D1S. In the present embodiment, the first up-bridge switching device M1 is a p-channel metal-oxide-semiconductor transistor.

The second up-bridge switching device M2 receives the second direction driving signal D2S and determines the ON or OFF state thereof according to the second direction driving signal D2S. In the present embodiment, the second up-bridge switching device M2 is a p-channel metal-oxide-semiconductor transistor.

The first down-bridge switching device M3 receives the third logic signal N1S and determines the ON or OFF state thereof according to the third logic signal N1S. In the present embodiment, the first down-bridge switching device M3 is an n-channel metal-oxide-semiconductor transistor.

The second down-bridge switching device M4 receives the fourth logic signal N2S and determines the ON or OFF state thereof according to the fourth logic signal N2S. In the present embodiment, the second down-bridge switching device M4 is an n-channel metal-oxide-semiconductor transistor.

Figure 6A:
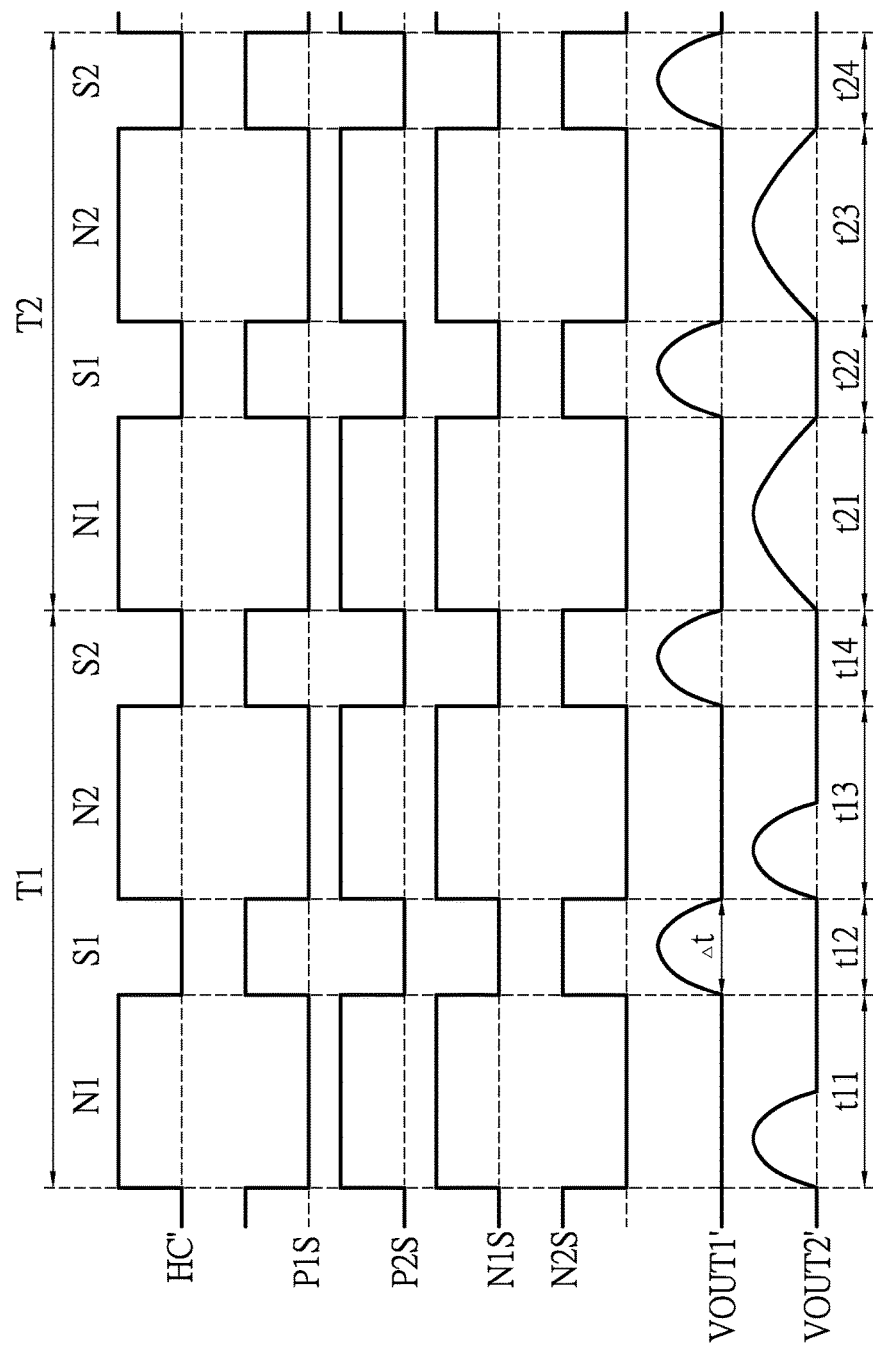
FIG. 6A is a waveform diagram showing the operation of a control apparatus for eliminating a magnetizing error of a rotor in a DC motor according to one embodiment of the present invention.

To describe the detailed implementation of the control apparatus 20, the present invention further provides a waveform diagram showing the operation thereof. With reference to FIG. 6A, FIG. 6A is a waveform diagram showing the operation of a control apparatus for eliminating a magnetizing error of a rotor in a DC motor according to one embodiment of the present invention. Moreover, the waveform diagram is applicable to the control apparatus 20 in FIG. 2. Therefore, please also refer to FIG. 2 and FIG. 5 for better understanding. However, the control apparatus 20 is only exemplary and the present invention is not limited thereto. The phase-switching signal HC' is a periodical square signal with two cycles T1 and T2, to which the present invention is not limited.

In the time interval t11 in the cycle T1, when the logic circuit 2081 detects the phase-switching signal HC' with a high voltage level, the logic circuit 2081 correspondingly outputs a second logic signal P2S and a third logic signal N1S with high voltage levels, and the logic circuit 2081 outputs a first logic signal P1S and a fourth logic signal N2S with low voltage levels. Then, the switching circuit 2083 receives the logic signals P1S and P2S from the logic circuit 2081 and receives the PWM signal PW1 from the PWM signal generator 206 so as to output the second direction driving signal D2S reverse to the PWM signal PW1 to the full-bridge driving circuit 210. The first direction driving signal D1S has a high voltage level. Afterwards, when the full-bridge driving circuit 210 receives the first direction driving signal D1S and the second direction driving signal D2S, the full-bridge driving circuit 210 receives the third logic signal N1S (with a high voltage level) and the fourth logic signal N2S (with a low voltage level) from the logic circuit 2081 and adjusts the second output signal VOUT2' equivalent to a positive half-wave sinusoid signal and transmits the second output signal VOUT2' to the DC motor 22 (i.e., VOUT1' has a low voltage level in the time interval t11). In short, the second output signal VOUT2' is adjusted equivalent to a positive half-wave sinusoid signal with the use of the second direction driving signal D2S that is reverse to the PWM signal PW1.

Moreover, in the time interval t12 in the cycle T1, when the logic circuit 2081 detects the phase-switching signal HC' with a low voltage level, the logic circuit 2081 correspondingly outputs a first logic signal P1S and a fourth logic signal N2S with high voltage levels, and the logic circuit 2081 outputs a second logic signal P2S and a third logic signal N1S with low voltage levels. Then, the switching circuit 2083 receives the logic signals P1S and P2S from the logic circuit 2081 and receives the PWM signal PW2 from the PWM signal generator 206 so as to output the first direction driving signal D1S reverse to the PWM signal PW2 to the full-bridge driving circuit 210. The second direction driving signal D2S has a high voltage level. Afterwards, when the full-bridge driving circuit 210 receives the first direction driving signal D1S and the second direction driving signal D2S, the full-bridge driving circuit 210 receives the third logic signal N1S (with a low voltage level) and the fourth logic signal N2S (with a high voltage level) from the logic circuit 2081 and adjusts the first output signal VOUT1' equivalent to a positive half-wave sinusoid signal and transmits the first output signal VOUT1' to the DC motor 22 (i.e., VOUT2' has a low voltage level in the time interval t12. In short, the second output signal VOUT2' is adjusted equivalent to a positive half-wave sinusoid signal with the use of the first direction driving signal D1S that is reverse to the PWM signal PW2.

Similarly, in the time intervals t13 and t14 in the cycle T1, the full-bridge driving circuit 210 alternately switches and outputs the second output signal VOUT2' and the first output signal VOUT1' equivalent to positive half-wave sinusoid signals to the DC motor 22 to drive the DC motor 22 to rotate. However, in the cycle T1 of the present embodiment, the PWM signals PW1~PW4 outputted by the PWM signal generator 206 have not been adjusted. Therefore, in the cycle T1, the first output signal VOUT1' and the second output signal VOUT2' outputted by the full-bridge driving circuit 210 may be sinusoid signals having the same cycle. For example, in the cycle T1, the first output signal VOUT1' and the second output signal VOUT2' are both sinusoid signals that rise from 0%-duty to 100%-duty and fall from 100%-duty to 0%-duty in their respective duty cycle Δt. It should be noted that the present invention is not limited to the length and implementation of the duty cycle Δt. A person of ordinary skill in the art may make any modifications according to practical demands.

Furthermore, it is found that, in the time intervals t11 and t13, the switching process by corresponding semiconductor switching devices ends too early, which easily leads to uneven phase switching and causes annoying vibration noise and lowered rotational speed of the DC motor due to motor resonance. To effectively overcome such problems in the cycle T1, the PWM signal generator 206 will adjust each of PWM signals PW1~PW4 outputted in order in a next cycle (the cycle T2). In other words, in the cycle T2, the PWM signal generator 206 outputs adjusted PWM signals PW1~PW4 according to the count value acquired in the cycle T1. Therefore, in the cycle T2, the first output signal VOUT1' and the second output signal VOUT2' outputted by the full-bridge driving circuit 210 are sinusoid signals with different duty cycles. In short, the control apparatus 20 of the present embodiment adjusts each of the PWM signals during phase switching according to the size of each of the magnetic pole positions of the rotor in the DC motor 22 to smooth the output signals from the full-bridge driving circuit. It should be noted that the present invention is not limited to the previous example of adjusting the PWM signals. A person of ordinary skill in the art may make any modifications according to practical demands.

As shown in FIG. 6A, for the larger-size magnetic pole positions N1 and N2 of the rotor in the DC motor 22 in the time intervals t21 and t23, the full-bridge driving circuit 210 of the control apparatus 20 of the present invention outputs the second output signal VOUT2' being a sinusoid signal having a longer duty cycle. On the contrary, for the smallersize magnetic pole positions S1 and S2 of the rotor in the DC motor 22 in the time intervals t22 and t24, the full-bridge driving circuit 210 of the control apparatus 20 of the present invention outputs the first output signal VOUT1' being a sinusoid signal having a shorter duty cycle.

Figure 6B:
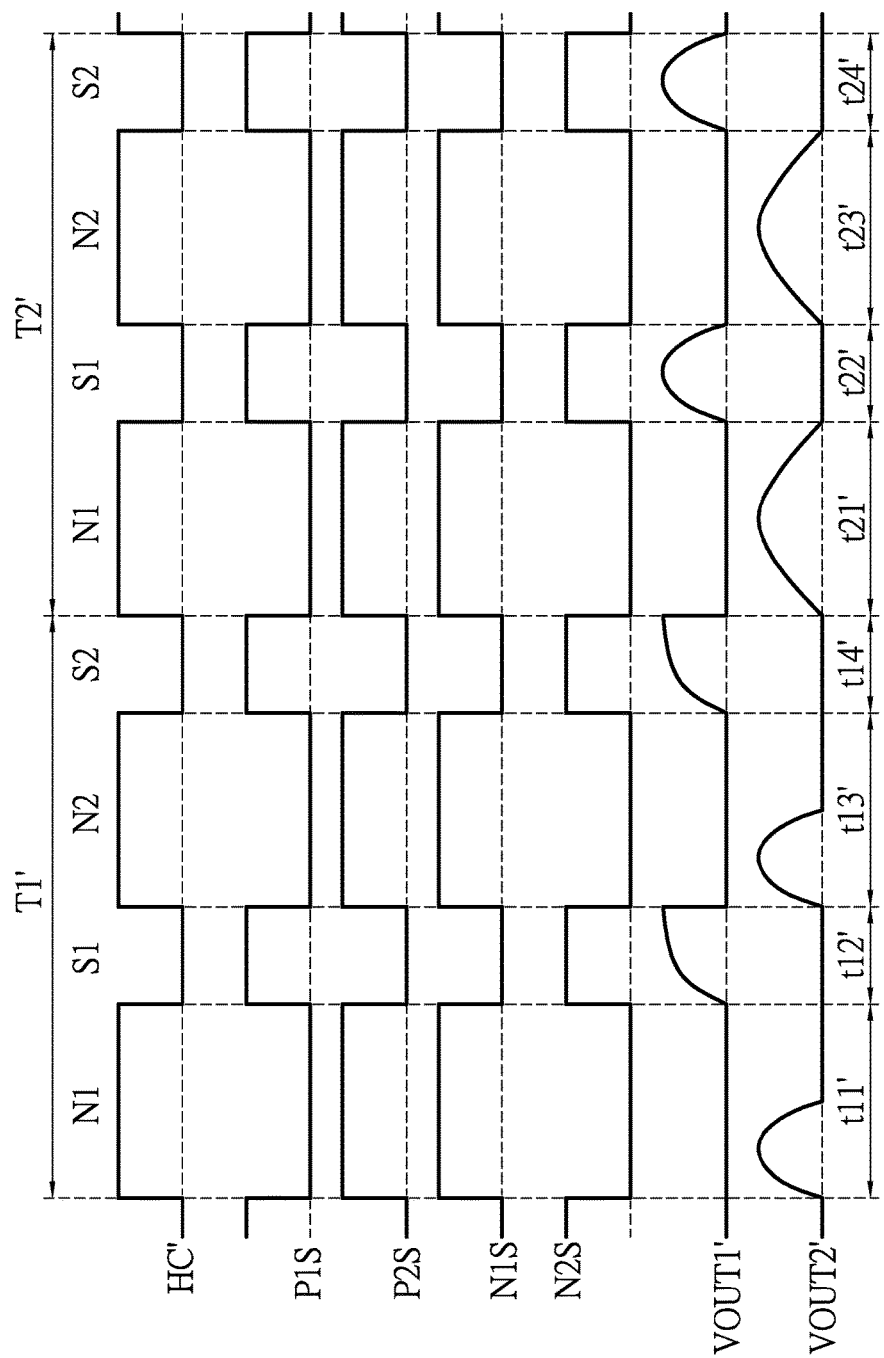
FIG. 6B is a waveform diagram showing the operation of a control apparatus for eliminating a magnetizing error of a rotor in a DC motor according to another embodiment of the present invention.

As stated above, the PWM signal generator 206 in one embodiment of the present invention adjusts each of the PWM signals PW1~PW2N outputted in order in a next cycle according to the count value, related to each of the magnetic pole positions, received in a current cycle. Therefore, with reference to FIG. 6B, FIG. 6B is a waveform diagram showing the operation of a control apparatus for eliminating a magnetizing error of a rotor in a DC motor according to another embodiment of the present invention. The waveform diagram is applicable to the control apparatus 20 in FIG. 2. Therefore, please also refer to FIG. 2 and FIG. 5 for better understanding.

Compared to FIG. 6A, FIG. 6B differs in that, in the cycle T1', each of PWM signals PW1~PW4 outputted in order by the PWM signal generator 206 is adjusted according to the count value with respect to a previous magnetic pole position. Accordingly, it is found that since the size for the magnetic pole positions N1 and N2 is twice the size for the magnetic pole positions S1 and S2, the count values with respect to the magnetic pole positions N1 and N2 are higher, the first output signal VOUT1' is a sinusoid signal changing from 0%-duty to 100%-duty in the time intervals t12' and t14' in the cycle T1. Similarly, uneven phase switching occurs to cause annoying vibration noise and lowered rotational speed of the DC motor due to motor resonance.

Similarly, as shown in FIG. 6B, in each of the time intervals t21'~t24' in a next cycle T2', the PWM signal generator 206 of the control apparatus 20 in one embodiment of the present invention adjusts each of the PWM signals PW1~PW4 outputted in order according to the count value acquired in a previous cycle T1 so as to smooth each of the output signals.

As stated above, in one embodiment of the present invention, the control apparatus 20 determines the size of each of the magnetic pole positions of the rotor in the DC motor 22 according to the counter 204, and the PWM signal generator 206 adjusts the PWM signals in a next cycle so as to smooth the output signals from the full-bridge driving circuit 210 to the DC motor 22.

Figure 7:
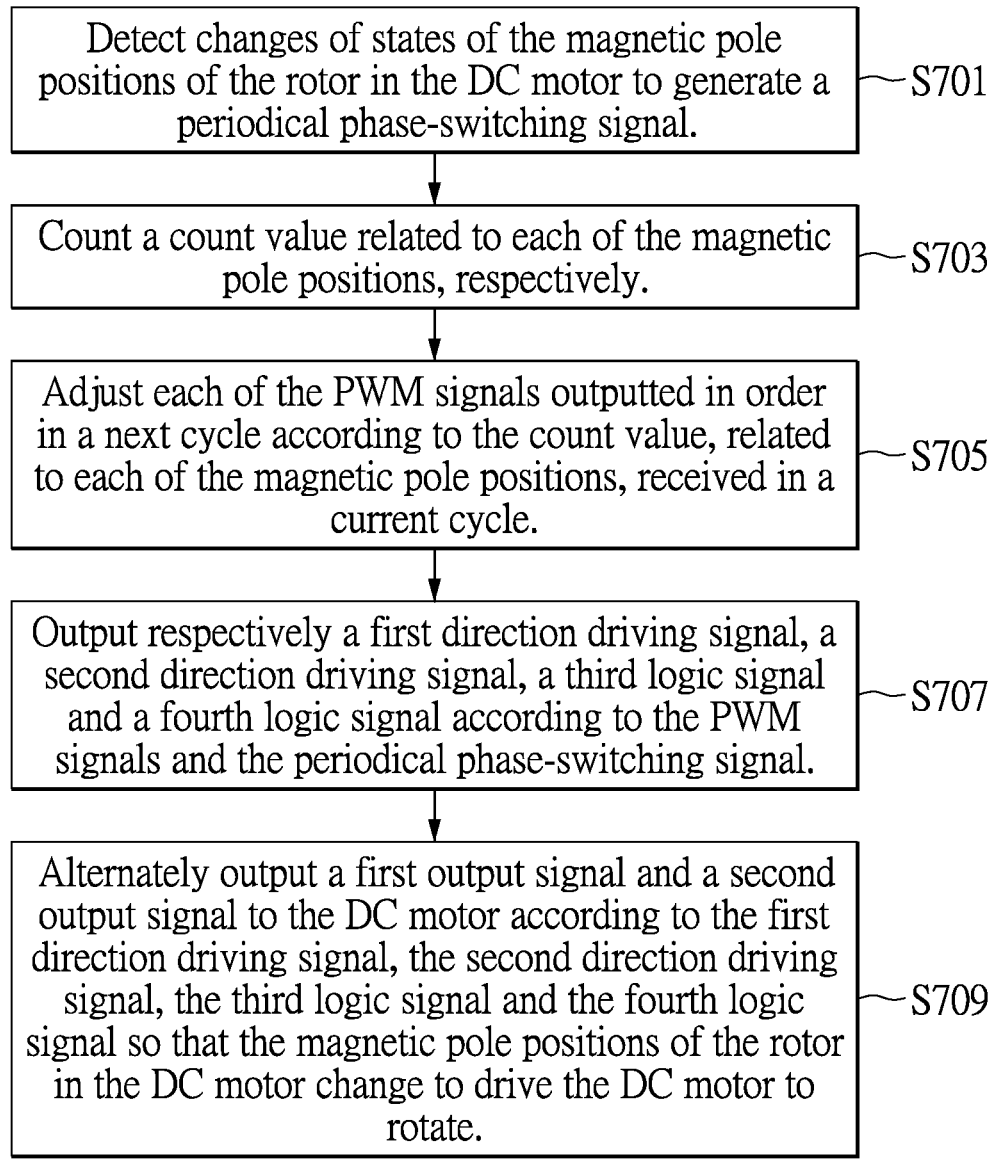
FIG. 7 is a flowchart showing a control method for eliminating a magnetizing error of a rotor in a DC motor according to one embodiment of the present invention.

To describe the operation of the control apparatus, the present invention further provides a control method for the control apparatus. With reference to FIG. 7, FIG. 7 is a flowchart showing a control method for eliminating a magnetizing error of a rotor in a DC motor according to one embodiment of the present invention. The control method is applicable to the control apparatus 20 in FIG. 2. Therefore, please also refer to FIG. 2 for better understanding. Moreover, some elements of the control apparatus have been described in detail in the previous embodiments, and descriptions thereof are not repeated herein.

First, in Step S701, the phase detector detects changes of states of the 2N magnetic pole positions of the rotor in the DC motor to generate a periodical phase-switching signal. Second, in Step S703, the counter counts a count value related to each of the magnetic pole positions, respectively, according to the periodical phase-switching signal. Then, in Step S705, the PWM signal generator adjusts each of the PWM signals outputted in order in a next cycle according to the count value, related to each of the magnetic pole positions, received in a current cycle. Then, in Step S707, the control circuit outputs respectively a first direction driving signal, a second direction driving signal, a third logic signal and a fourth logic signal according to the PWM signals and the periodical phase-switching signal. Last, in Step S709, the full-bridge driving circuit alternately outputs a first output signal and a second output signal to the DC motor according to the first direction driving signal, the second direction driving signal, the third logic signal and the fourth logic signal so that the magnetic pole positions of the rotor in the DC motor change to drive the DC motor to rotate.

Furthermore, when the size of the magnetic pole positions N1 and N2 of the rotor in the DC motor 22 is much larger than the size of the magnetic pole positions S1 and S2 and the PWM signal generator outputs unadjusted PWM signals, uneven phase switching easily occurs to cause annoying vibration noise and lowered rotational speed of the DC motor due to motor resonance. Therefore, according to the count value, with respect to the each of magnetic pole positions, acquired in a previous cycle, the control apparatus in one embodiment of the present invention effectively determines the size of each of magnetic pole positions so that the PWM signal generator adjusts the PWM signals to smooth the output signals to the DC motor from the full-bridge driving circuit.

As stated above, one embodiment of the present invention provides a control apparatus for eliminating a magnetizing error of a rotor in a DC motor and a method thereof, capable of counting a count value associated with the change of the state of each of the magnetic pole positions of the rotor in the DC motor to adjust each of the PWM signals issued in a next cycle to control the ON or Off states of semiconductor switching devices to lower the vibration noise and increase the rotational speed of the motor.

The above-mentioned descriptions represent merely the exemplary embodiments of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A control apparatus for eliminating a magnetizing error of a rotor in a DC motor, wherein said rotor in said DC motor is provided with 2N magnetic pole positions disposed therein for phase switching, and N is a positive integer no less than 1, said control apparatus comprising:
   a phase detector for detecting changes of states of said magnetic pole positions of said rotor in said DC motor to generate a periodical phase-switching signal;
   at least one counter, coupled to said phase detector, for counting a count value related to a size of each of said magnetic pole positions of said rotor in said DC motor, an occupation ratio of each of said magnetic pole positions to said rotor in said DC motor and each of time intervals with respect to each of said magnetic pole positions, respectively, according to said periodical phase-switching signal;
   a PWM signal generator, coupled to outputs of said counter and said phase detector, for periodically outputting 2N PWM signals, wherein said PWM signal generator adjusts each of said PWM signals outputted in order in a next cycle according to said count value, related to said size of each of said magnetic pole positions of said rotor in said DC motor, said occupation ratio of each of said magnetic pole positions to said rotor in said DC motor and each of said time intervals with respect to each of said magnetic pole positions, received in a current cycle;

a control circuit, coupled to outputs of said PWM signal generator and said phase detector, for outputting respectively a first direction driving signal, a second direction driving signal, a first logic signal and a second logic signal according to said PWM signals generated by said PWM signal generator and said periodical phase-switching signal generated by said phase detector; and a full-bridge driving circuit, coupled to outputs of said control circuit and comprising two output terminals coupled to said DC motor, for alternately outputting a first output signal and a second output signal to said DC motor according to said first direction driving signal, said second direction driving signal, said first logic signal and said second logic signal from said control circuit so that said magnetic pole positions of said rotor in said DC motor change to drive said DC motor to rotate.

2. The control apparatus of claim 1, wherein said full-bridge driving circuit comprises four semiconductor switching devices arranged in an H-bridge configuration, and said semiconductor switching devices are coupled between said control circuit and a coil of said DC motor.

3. The control apparatus of claim 1, wherein said control circuit further comprises:
 a logic circuit, coupled to said phase detector, for outputting a third logic signal, a fourth logic signal, said first logic signal and said second logic signal according to a level state of said periodical phase-switching signal, wherein said third logic signal is reverse to said fourth logic signal; and
 a switching circuit, coupled to said logic circuit and said PWM signal generator, for generating said first direction driving signal according to said PWM signals and said third logic signal, and generating said second direction driving signal according to said PWM signals and said fourth logic signal.

4. The control apparatus of claim 3, wherein said full-bridge driving circuit outputs said first output signal to said DC motor according to said first direction driving signal and said second logic signal, and outputs said second output signal to said DC motor according to said second direction driving signal and said first logic signal, wherein said first output signal and said second output signal are both positive half-wave sinusoid signals.

5. A control method for a control apparatus for eliminating a magnetizing error of a rotor in a DC motor, wherein said rotor in said DC motor is provided with 2N magnetic pole positions disposed therein for phase switching, N is a positive integer no less than 1, said control apparatus comprises a phase detector, at least one counter, a PWM signal generator, a control circuit and a full-bridge driving circuit, and said PWM signal generator periodically outputs 2N PWM signals so that said magnetic pole positions of said rotor in said DC motor change, said control method comprising:
 detecting, by said phase detector, changes of states of said magnetic pole positions of said rotor in said DC motor to generate a periodical phase-switching signal;
 counting, by said counter, a count value related to a size of each of said magnetic pole positions of said rotor in said DC motor, an occupation ratio of each of said magnetic pole positions to said rotor in said DC motor and each of time intervals with respect to each of said magnetic pole positions, respectively, according to said periodical phase-switching signal;
 adjusting, by said PWM signal generator, each of said PWM signals outputted in order in a next cycle according to said count value, related to said size of each of said magnetic pole positions of said rotor in said DC motor, said occupation ratio of each of said magnetic pole positions to said rotor in said DC motor and each of said time intervals with respect to each of said magnetic pole positions, received in a current cycle;
 outputting, by said control circuit, respectively a first direction driving signal, a second direction driving signal, a first logic signal and a second logic signal according to said PWM signals generated by said PWM signal generator and said periodical phase-switching signal generated by said phase detector; and
 alternately outputting, by said full-bridge driving circuit, a first output signal and a second output signal to said DC motor according to said first direction driving signal, said second direction driving signal, said first logic signal and said second logic signal from said control circuit so that said magnetic pole positions of said rotor in said DC motor change to drive said DC motor to rotate.

6. The control method of claim 5, wherein said full-bridge driving circuit comprises four semiconductor switching devices arranged in an H-bridge configuration, and said semiconductor switching devices are coupled between said control circuit and a coil of said DC motor.

7. The control method of claim 5, wherein said control circuit further comprises:
 a logic circuit, coupled to said phase detector, for outputting a third logic signal, a fourth logic signal, said first logic signal and said second logic signal according to a level state of said periodical phase-switching signal, wherein said third logic signal is reverse to said fourth logic signal; and
 a switching circuit, coupled to said logic circuit and said PWM signal generator, for generating said first direction driving signal according to said PWM signals and said third logic signal, and generating said second direction driving signal according to said PWM signals and said fourth logic signal.

8. The control method of claim 7, wherein said full-bridge driving circuit outputs said first output signal to said DC motor according to said first direction driving signal and said second logic signal, and outputs said second output signal to said DC motor according to said second direction driving signal and said first logic signal, wherein said first output signal and said second output signal are both positive half-wave sinusoid signals.

* * * * *